United States Patent [19]
Holland

[11] Patent Number: 5,399,844
[45] Date of Patent: Mar. 21, 1995

[54] INSPECTION PROMPTING AND READING RECORDING SYSTEM

[75] Inventor: Richard F. Holland, Evanston, Ill.

[73] Assignee: Facility Management Systems, Inc., Ill.

[21] Appl. No.: 3,260

[22] Filed: Jan. 12, 1993

[51] Int. Cl.$^6$ .................... G06F 15/46; G06F 15/21; G06F 15/40
[52] U.S. Cl. .................... 235/376; 235/375; 364/402
[58] Field of Search .................... 235/375, 376, 385; 364/402, 403, 464.04

[56] References Cited

U.S. PATENT DOCUMENTS

| | | | |
|---|---|---|---|
| 4,133,034 | 1/1979 | Etter | 364/464.04 |
| 4,387,296 | 6/1983 | Newell et al. | 235/376 |
| 4,688,026 | 8/1987 | Scribner et al. | 340/592 |
| 4,757,456 | 7/1988 | Benghiat | 364/464.04 |
| 4,803,632 | 2/1989 | Frew et al. | 364/464.04 |
| 5,047,615 | 9/1991 | Fukumoto et al. | 235/375 X |
| 5,055,660 | 10/1991 | Bertagna et al. | 235/375 X |
| 5,065,003 | 11/1991 | Wakatsuki et al. | 235/375 X |
| 5,120,942 | 6/1992 | Holland et al. | 235/376 |
| 5,142,128 | 8/1992 | Perkin et al. | 235/375 |
| 5,166,499 | 11/1992 | Holland et al. | 235/376 |
| 5,218,187 | 6/1993 | Koenck et al. | 235/375 |
| 5,262,940 | 11/1993 | Sussman | 364/403 |

OTHER PUBLICATIONS

"Cappa Newsletter", Eli G. Katz, P.E., Issue 40 (Nov. 1987).

Primary Examiner—Donald Hajec
Assistant Examiner—Jeffrey R. Filipek
Attorney, Agent, or Firm—Willian Brinks Hofer Gilson & Lione

[57] ABSTRACT

An inspection prompting and reading recording system includes a portable computer having a display, a keyboard, a bar scanner, a memory, a processor, and a sound generator. Each group of components is provided with a respective bar code label. When the computer system scans one of these bar code labels, it automatically prompts an inspector to enter appropriate readings for the components of that group. These readings are checked against stored expected responses and the inspector is warned of an abnormal condition. The readings that make up the inspection for each group are stored in the computer system in component files, and the groups identify readings to be taken by listing the separate components. In this way, memory requirements of the computer system are reduced. Readings entered by an inspector are stored in a data module for later processing and use.

14 Claims, 13 Drawing Sheets

| GROUP PROMPT (GDESC) | COMPONENT PROMPT (GCIDENT, CDESC) | READING PROMPT (RNAME) | READING TYPE PROMPT (RTEXT) | EXPECTED RESPONSES (LOW AND HIGH) |
|---|---|---|---|---|
| SOUTH CATWALK | METERING MODULE | METERING PUMP RUNNING ? MIX /BOOST PUMP SWITCH WATER SUPPLY PRESSURE CONTROL VALVE % SETTING | YES/NO ON/OFF/AUTO NUMERICAL READING NUMERICAL READING | YES ON, AUTO 64 069 75 85 |
| | DISTRIBUTION PANEL | INTERLOCK VALVE CHEMICAL FLOW ATOMIZING AIR PRESSURE GENERAL HOUSEKEEPING | OPEN/CLOSED NUMERICAL READING NUMERICAL READING OK/NOK | OPEN (NO TEST FOR EXPECTED RESPONSE) 6.4 6.9 OK |

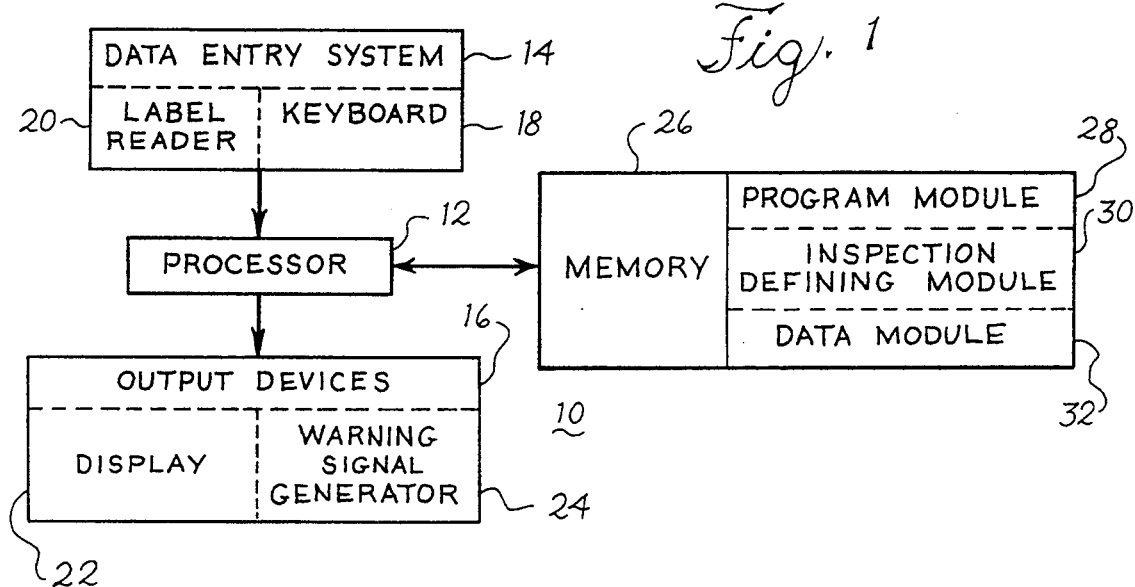
Fig. 1
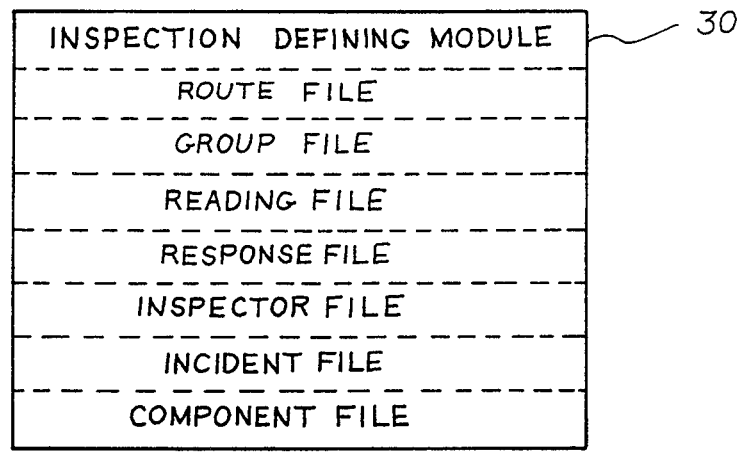
Fig. 2
Fig. 3

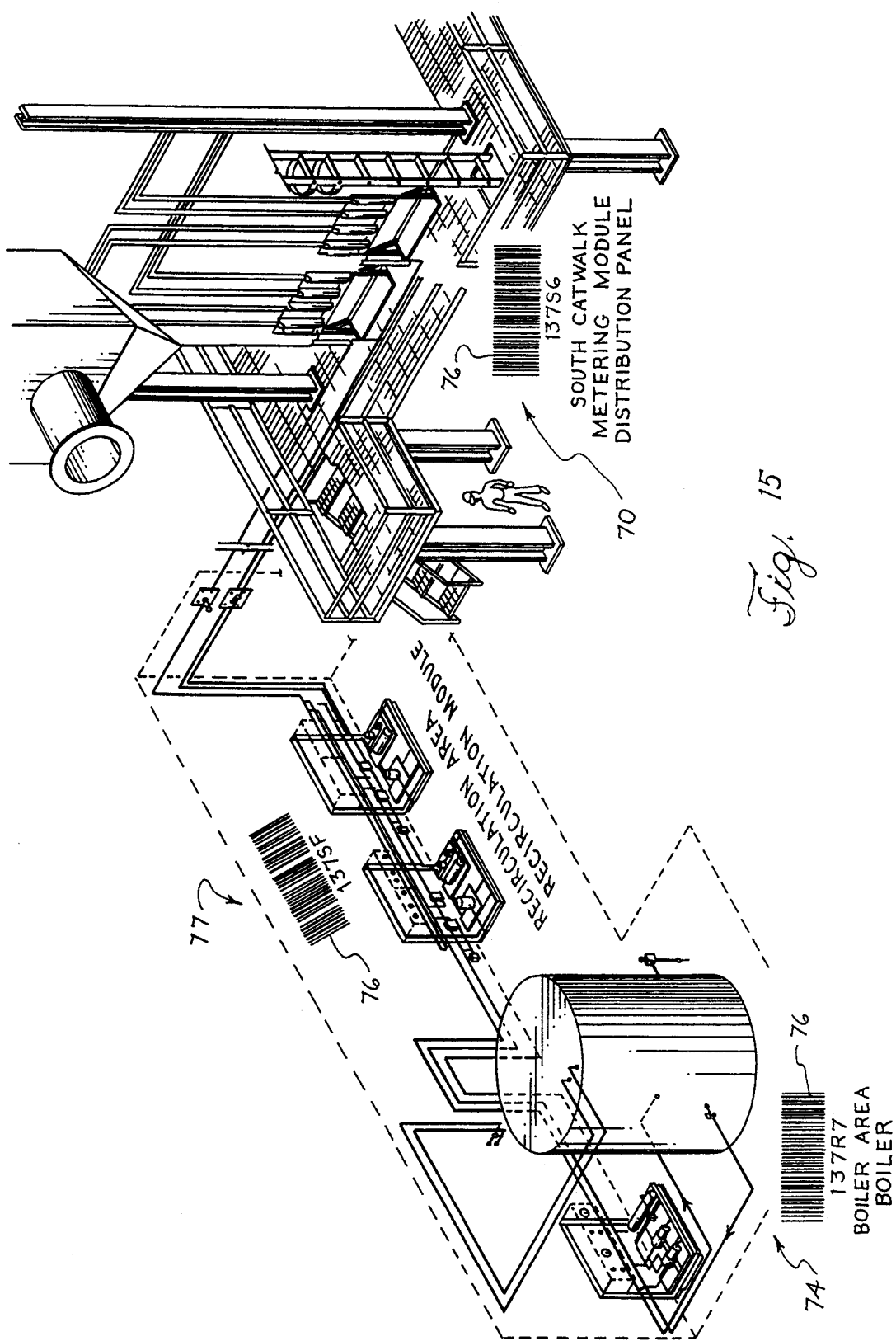

| GROUP PROMPT (GDESC) | COMPONENT PROMPT (GCIDENT, CDESC) | READING PROMPT (RNAME) | READING TYPE PROMPT (RTEXT) | EXPECTED RESPONSES (LOW AND HIGH) |
|---|---|---|---|---|
| SOUTH CATWALK | METERING MODULE | METERING PUMP RUNNING? | YES/NO | YES |
| | | MIX/BOOST PUMP SWITCH | ON/OFF/AUTO | ON, AUTO |
| | | WATER SUPPLY PRESSURE | NUMERICAL READING | 64  069 |
| | | CONTROL VALVE % SETTING | NUMERICAL READING | 75  85 |
| | DISTRIBUTION PANEL | INTERLOCK VALVE | OPEN/CLOSED | OPEN |
| | | CHEMICAL FLOW | NUMERICAL READING | (NO TEST FOR EXPECTED RESPONSE) |
| | | ATOMIZING AIR PRESSURE | NUMERICAL READING | 6.4  6.9 |
| | | GENERAL HOUSEKEEPING | OK/NOK | OK |

Fig. 16

METERING MODULE
METERING PUMP RUNNING?     NO
YES

METERING MODULE
ENTER WATER SUPPLY PRESSURE
62

```
12/04/92                        DETAIL TOUR REPORT                        Page: 1
12:22:23                                                                  Of Tour: 1
                        Engineer: Jackson, AB
                           Start: 12/04/92    11:09
                             End: 12/04/92    11:47

READING              EXPECTED
────────────────────────────────────────────────────────────────────────
GROUP:      South Catwalk            137S6               12/04/92  11:09

COMPONENT:  Metering Module

Metering Pump Running?    YES                 YES
            Mix/Boost Pump Switch     ON                  AUTO
                                      Out of Range
                                      Req Action Takn Water Supply Pressure     65                  64      69
            Control Valve % Position  68                  75      85
                                      Out of Range
                                      Report to Super
                                      Req Action Takn COMPONENT:  Distribution Panel
            Interlock Valve           OPEN                OPEN
            Chemical Flow             23
            Atomizing Air Pressure    6.5                 6.4     6.9
            General Housekeeping      NOK                 OK
                                      Out of Range
                                      Rubbish in Area GROUP:      Boiler Area              137RZ               12/04/92  11:15

COMPONENT:  Boiler

Boiler O2%                18                  0       20.
            Boiler CO#/BT             .01                 0       0.02
            Boiler NOx                .9                  0       1.

GROUP:      Recirc Area              137SF               12/04/92  11:17

COMPONENT:  Recirculation Module

NOxOUT Storage Tank Level 29                  25      100
            Circulation Pump Running? YES                 YES
            Heater on?                YES                 YES
            Recirc Temperature        27
            Discharge Pressure        85

End of Report
```

INSPECTION PROMPTING AND READING RECORDING SYSTEM

BACKGROUND OF THE INVENTION

This invention relates to a system that automatically prompts inspection of multiple components, and records inspection readings supplied by a user.

Many modern plants and factories include a large array of equipment that is inspected on a regular basis. In the past, one generally used approach was for an inspector to move from component to component working down a checklist on a clipboard. For each entry on the checklist the inspector would inspect the relevant component and then record the results of the inspection. For example, numerical readings such as gauge readings for pressure, temperature, flow and the like are often recorded, as well as readings regarding the state of valves (open/closed) and electrical switches (on/off).

This manual approach to recording inspection readings has many disadvantages. First, the inspection readings are recorded as manual entries on paper sheets. It is therefore cumbersome and time consuming to prepare summary reports, and when readings are reentered into an automatic data processing system there is a possibility for error in transcription. Furthermore, supervisors have no way of ascertaining whether the inspections were actually conducted as stated, because it is always possible that an inspector may enter inspection results without actually being present in the vicinity of the components being inspected.

U.S. Pat. Nos. 5,166,499 and 5,120,942, assigned to the assignee of the present invention, disclose a computer implemented tour monitoring system that can be used by a watchman or a guard to document guard rounds. This system has been found to be efficient and reliable in use, but it is not directed to the problem of facilitating the inspection of physical equipment and the recording of readings based upon such inspections.

Scribner U.S. Pat. No. 4,688,026 relates to another computer based system for collecting and using data associated with tagged objects. In the embodiment discussed at the top of column 9, a coded tag is placed in a room, and when the tag is scanned by a portable computer, the computer prompts the user to perform a programmed series of checks or other work associated with the objects in that room. After performing the work, the user may enter confirmation that it has been performed, thereby updating the schedule in the memory of the portable computer or the code of the tag itself. This system also is not directed to the problem addressed by the present invention, namely the efficient recording of readings obtained from inspections of physical components.

The article entitled "Pocket Micro Computers For Campus Maintenance Management" by Eli G. Katz (CAPPA Newsletter, Issue 40 (Nov. 1987) discusses the use of pocket micro computers for campus maintenance management. However, as shown in FIG. 3 of this article, a bar coded tag is applied to each item being maintained. This approach, if applied to a complex physical plant, would result in an inconveniently large number of bar coded tags which would be cumbersome to apply and to read on a regular basis.

Accordingly, it is an object of this invention to provide an improved inspection prompting and reading recording system that is well suited for the recording of readings indicative of the state of physical equipment in a plant inspection, while avoiding an excessive number of machine readable labels and including features that increase the reliability of the recorded readings.

SUMMARY OF THE INVENTION

In general, this invention relates to an inspection prompting and reading recording system comprising of portable computer system comprising a display, a data entry system, a memory, and a processor responsive to the data entry system to control the display and the memory. The processor responds to the data entry system to display prompt information associated with each of the components of a group of components when the data entry system receives identification information associated with that group. The processor stores readings entered by user via the data entry system in response to the prompt information.

According to a first aspect of this invention, a system of this type is provided with a memory comprising an inspection defining module and a data module. The inspection defining module comprises a plurality of groups, and each of the groups identifies at least one component record while at least one of the groups identifies a plurality of component records. Each of the component records identifies prompt information for a respective set of inspections associated with the respective component.

Because the inspection defining module comprises groups which in turn identify component records, and because it is the component records that identify respective sets of inspections, the system can be set up for a new inspection in an efficient manner. Typically, a plant or factory will include multiple examples of certain component types. The system set out above allows the portable computer system to be programmed with component records for each of these component types. Once this is done, the inspection can be defined merely by specifying the groups and the component records included within each group. This eliminates the need to program the computer system with redundant readings for separate examples of a given component type. In this way the computer system is made more easily programmable, and the memory requirements of the computer system are reduced.

According to a second aspect of this invention, a system of the type described initially above is provided with a memory comprising an inspection defining module and a data module, wherein the inspection defining module comprises a plurality of groups, and each of the groups identifies prompt information for a respective set of inspections associated with components included in that group. According to this aspect of the invention, expected response information is provided for at least some of the inspections, and this information defines a set of normal readings for the respective inspection. The processor generates a warning signal when a comparison between one of the user supplied readings and the respective expected response information indicates an abnormal condition.

This aspect of the invention alerts the user when a user supplied reading is indicative of an abnormal condition. In this way the user is prompted to check the accuracy of the user supplied reading, and thereby to correct an inadvertent entry error. Also, if desired the user can be prompted to take appropriate action in response to an abnormal condition.

The invention itself, together with further objects and attendant advantages, will best be understood by reference to the following detailed description, taken in conjunction with the accompanying drawings.

BRIEF DESCRIPTION OF THE DRAWINGS

FIG. 1 is a block diagram of an inspection prompting and data recording system that incorporates a presently preferred embodiment of this invention.

FIG. 2 is a block diagram of the inspection defining module of FIG. 1.

FIG. 3 is a block diagram of the data module of FIG. 1.

FIG. 15 is a perspective view of a portion of a plant that will be used to illustrate operation of the system of FIG. 1.

FIG. 16 is a table that provides an example of information stored in the inspection defining module for one of the component groups shown in FIG. 15.

FIGS. 17 and 18 are examples of displays generated by the system of FIG. 1 in use.

FIG. 19 is an example of a report summarizing data stored in the data module of FIG. 1 for a particular example based on the component groups shown in FIG. 15.

DETAILED DESCRIPTION OF THE PRESENTLY PREFERRED EMBODIMENTS

Figure 4:
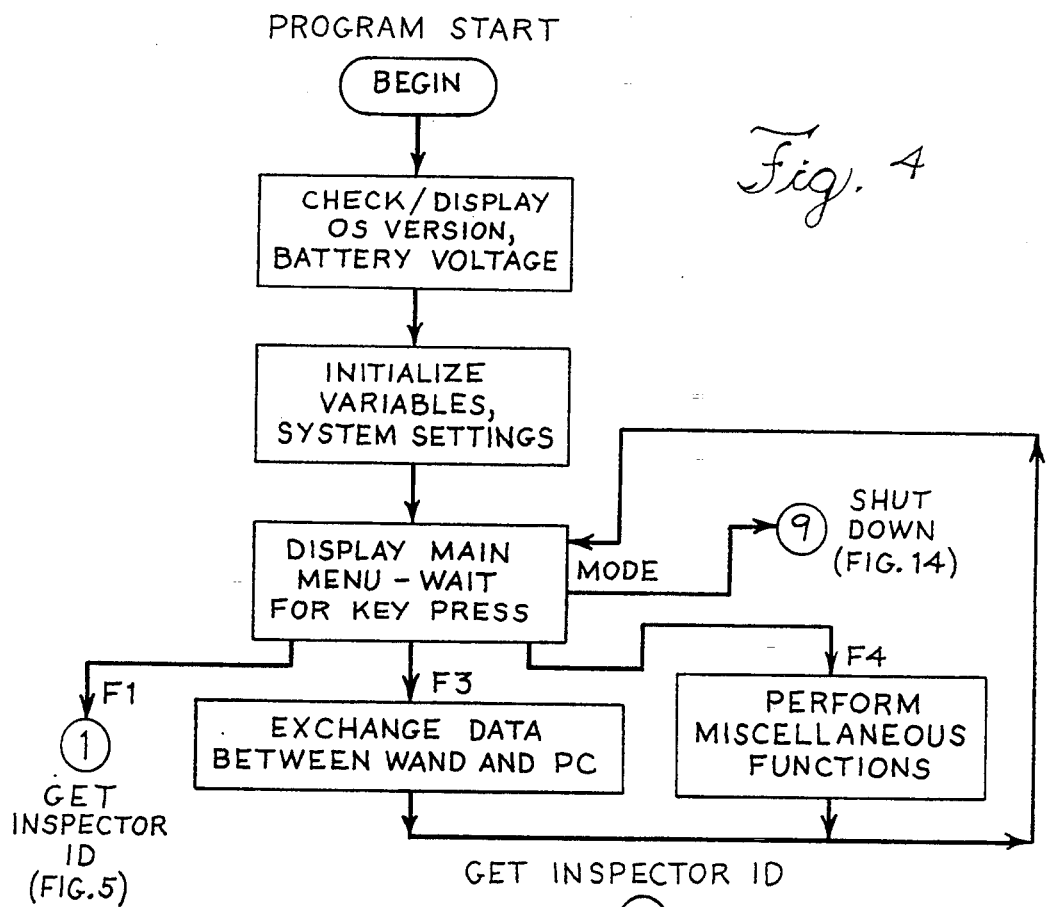
FIGS. 4 through 14 together make up a flow chart of the program included in the program module of FIG. 1.

Turning now to the drawings, FIG. 1 shows a block diagram of a portable computer system 10 that incorporates a presently preferred embodiment of this invention. This system includes a processor 12 that receives information via a data entry system 14, and that supplies information to a user via output devices 16. In this embodiment, the data entry system 14 includes a keyboard 18 and a label reader 20. The keyboard 18 preferably includes function keys as well as a miniature alphanumeric keyboard. The label reader 20 is of the type capable of reading machine readable labels, such as bar code labels for example. In this embodiment, the label reader 20 preferably is an optical scanning system that is used by sweeping the label reader across a bar code.

The output devices 16 in this embodiment include a display 22 and a warning signal generator 24. For example, the display can be a liquid crystal display capable of displaying four lines of alphanumeric text, and the warning signal generator can be a sound generator.

The processor 12 communicates with a memory 26 that for purposes of explanation can be considered as divided into a program module 28, an inspection defining module 30, and a data module 32. Of course, use of the term "module" does not imply that the modules 28, 30 and 32 are separate elements, or even that they are confined to contiguous memory locations. Rather, the term "module" is used in its broad sense to designate a set of information or a set of memory locations, whether contiguous to one another or not.

The features of the portable computer system 10 described above are conventional and do not per se form part of this invention. For this reason, they will not be described in further detail here. A suitable portable computer system 10 (without any of the programming described below) can be obtained from Hand Held Products, Charlotte, N.C. identified as a Micro-Wand 3E. This device includes 128K bytes of RAM memory and a battery powered power supply. It is portable, rugged and easily carried from component to component in an inspection.

FIG. 2 is a block diagram showing the organization of the inspection defining module 30. As shown in FIG. 2, the inspection defining module 30 includes a number of separate files, and these files are described in greater detail in Table 1.

TABLE 1

| Inspection Defining Module | | |
|---|---|---|
| A. Route File | | A list of groups in the route, including the following information for each group: |
| | GBAR | Group Bar Code, used as a pointer to Group File; |
| | GDESC | Identifying message to be displayed for individual group; |
| | CHECKED | Group Flag that starts equal to zero but is changed to one after group has been checked. |
| B. Group File | | A list of components that make up each group, including the following information for each component: |
| | GBAR | Group Bar Code; |
| | CSERIAL | Component Type Identifier, used as a pointer to Reading File and Component File; |
| | GCSERIAL | Identifier for individual component; |
| | GCIDENT | Supplemental description to be displayed for individual component. |
| C. Reading File | | A list of readings to be prompted and recorded for each component type, including the following information for each reading: |
| | CSERIAL | Component Type Identifier; |
| | RNAME | Identifying message for reading to be displayed as a prompt message; |
| | RSERIAL | Reading identifier; |
| | LOW | Lower limit or valid option, depending on Response Code; |
| | HIGH | Upper limit or valid option, depending on Response Code; |
| | RCODE | Response Code, used as a pointer to Response File. |
| D. Response File | | A list of Response Codes, including the following information for each Response Code: |
| | RCODE | Response Code; |
| | RTYPE | Reading response type: O = multiple choice, R = numerical entry; |
| | RTEXT | Key identifying message to be displayed with RNAME for multiple choice readings. |
| E. Inspector File | | A list of valid inspector identification numbers (IID). |
| F. Incident File | | A list of valid incident codes (ICODE), with a confirming message for each. |
| G. Component File | | A list of component names to be displayed (CDESC). |

As apparent from Table 1, the Route File is a list of groups of components in the route, and each of the groups is characterized by a distinctive group bar code, which is contained on a respective machine readable label. As described below, these machine readable labels are placed near the physical location of the respective groups of components.

The Group File provides a list of components that make up each of the groups. In this connection, a component is a piece of physical equipment to be inspected, and each component is characterized by a Component Type Identifier (CSERIAL), which is used as a pointer to a Reading File. In this way, the readings required for any particular type of component are stored only once, thereby reducing memory requirements and simplifying programming. For example, if during an inspection a certain type of component is inspected ten times, the information stored for prompting the readings for these ten separate inspections is stored only once in the Reading File.

The Reading File provides a list of readings to be prompted and recorded for each component type. Note that the Reading File includes a Response Code that is used as a pointer to the Response File for the particular reading. The Reading File may also include information which specifies the expected responses (upper and lower limits for numerical readings, or the particular multiple choice readings) which are considered normal.

The Response File provides an indication of the response type that is expected in response to the reading prompt (multiple choice or numerical entry), along with key identifying messages for individual multiple choice readings. For example, in this embodiment when the variable RTYPE is equal to 0 the expected user supplied reading is a multiple choice selection (such as an on/off reading), while when the variable RTYPE is equal to R, the expected user supplied reading is a numerical entry (such as a pressure reading or a temperature reading).

The inspection defining module also includes an Inspector File that lists the valid inspector identification numbers, an Incident File that lists the valid incident codes and a confirming message for each, and a Component File that lists the component names. Incident codes are used by an inspector to record incidents, actions taken, or abnormal conditions. For example, the inspector can be provided with a card having a list of bar codes with the name of an incident, action, or condition associated with each bar code. The inspector can then scan the respective bar code when he wishes to record an incident, action taken or condition, thereby causing the appropriate incident code to be read by the label reader 20 of the portable computer system 10.

FIG. 3 provides a schematic representation of the data module 32 of this embodiment. On occasion in the following discussion the contents of the data module will be referred to as an inspection log. This log includes a series of entries, and each entry is one of four types.

The initial entry in the log is identified as a G entry, and it includes the inspector identification number (IID) and a time and date stamp. The time and date stamp is indicated by the symbol "TD" in FIG. 3.

The second type of entry in the log is a group bar code entry indicated by the symbol "E". This entry includes the group bar code (GBAR) of a scanned machine readable label, along with a time and date stamp.

The third type of entry in the log is a reading entry, indicated by the symbol "R". Each reading entry includes a user supplied reading (either a numerical reading or a multiple choice reading) and a time and date stamp.

The fourth type of entry is an incident entry which is preceded by the symbol "I" and includes the incident code (ICODE) and a time and date stamp.

Thus, the data module 32 records the information collected by the portable computer system 10 during an inspection. This information can readily be downloaded from the portable computer system 10 to a report generating computer (not shown) which can readily be programmed to use this information to generate appropriate reports summarizing the results of the inspection.

FIGS. 4 through 14 are flow charts that define the program stored in the program module 28 of this embodiment. These flow charts will be discussed generally, and an example will be provided illustrating the operation of the computer system 10. Attached Appendix A is a printout of the program that is flow charted in FIGS. 4 through 14. This listing is intended as the primary disclosure, and in the event of any inconsistency between the listing and the flow chart, it is the listing that is to control. Appendix A also includes a listing for a report generating computer (not shown) that loads the inspection defining module 30 and generates reports based on the contents of the data module 28.

Turning now to FIGS. 4 through 14, each of these figures is a flow chart of a respective routine included in the program module 28. The routine of FIG. 4 is the Program Start Routine, which is executed initially when power is supplied to the portable computer system 10. The Program Start Routine initially checks and displays the operating system version and the battery voltage, and then initializes appropriate variables and system settings. The routine then displays the main menu and waits for the inspector to press an appropriate key: the MODE key is used to shut down the computer system (FIG. 14), the F3 key is used to initiate routines (not shown) used to exchange data between the portable computer system 10 and the report generating computer, and the F4 key is used to perform miscellaneous functions (not specifically shown in the drawings). In the flow chart, the term "wand" is on occasion used to designate the portable computer system 10, and the term "PC" is on occasion used to designate the report generating computer (not shown).

Figure 5:
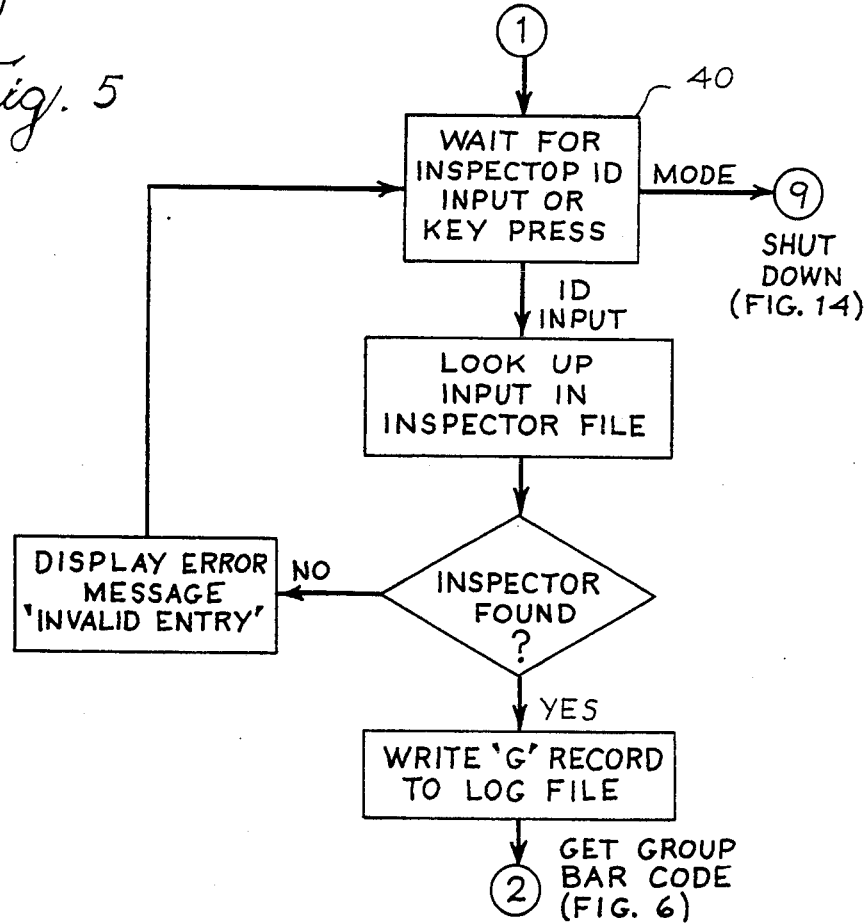

In the event an inspector wishes to initiate an inspection the appropriate action is to press the F1 key, which transfers control to the Get Inspector ID Routine of FIG. 5.

As shown in FIG. 5, this routine first waits for an inspector ID number to be supplied via the keyboard 18. If the MODE key is pressed control branches to the Shut Down Routine of FIG. 14. If an ID number is supplied, the routine checks to determine whether the supplied ID number is present in the Inspector File. If not, an error message is displayed and control is returned to block 40. On the other hand, if the entered ID number corresponds to one of the stored inspector identification numbers (IID) then a G record is written into the log file in the data module 32, and control is transferred to the Get Group Bar Code Routine of FIG. 6.

Figure 6:
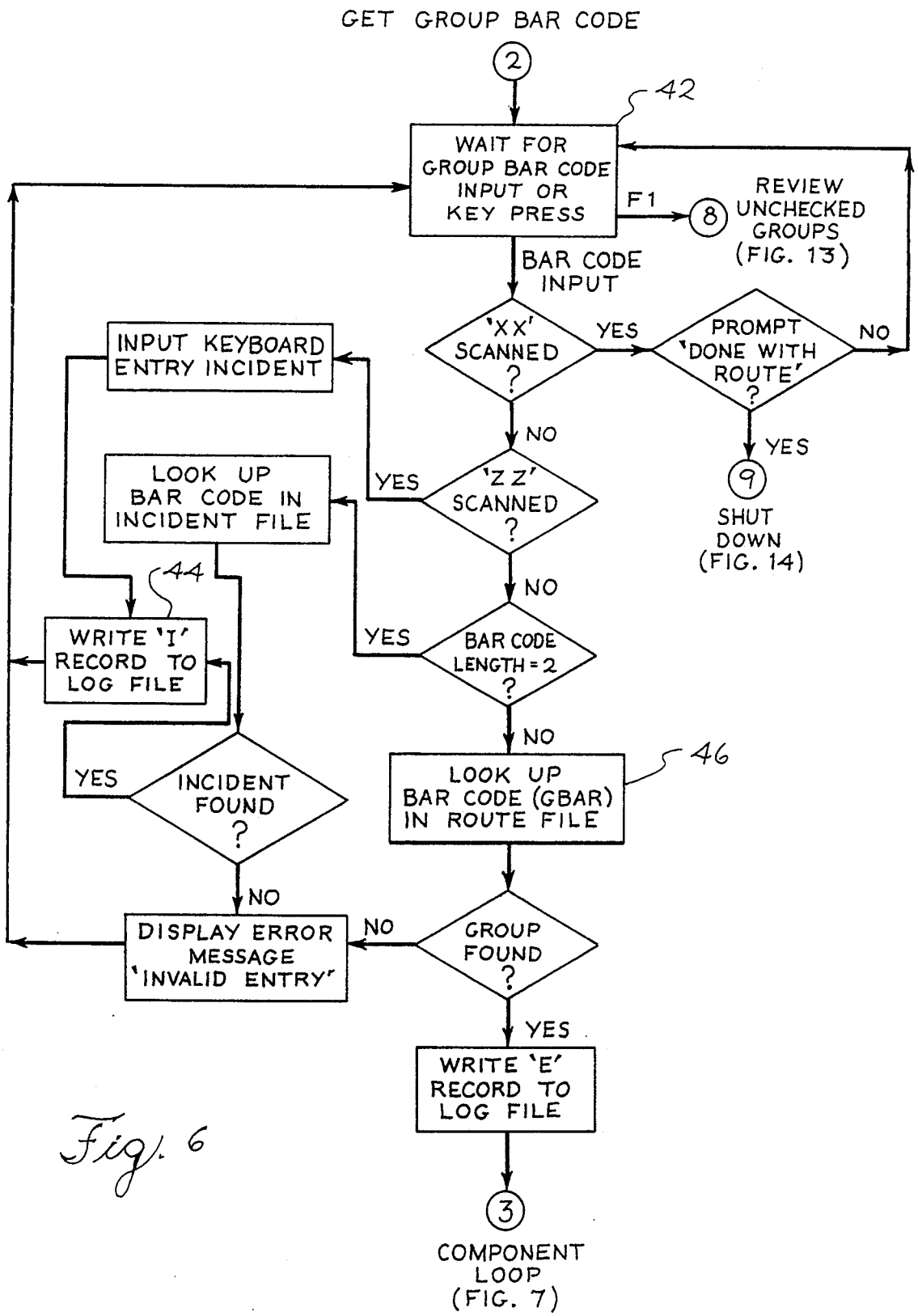

The Get Group Bar Code Routine recognizes a scanned group bar code and enters the appropriate E record in the log file. As shown in FIG. 6, this routine first waits for an appropriate data entry. If the MODE key is pressed control is transferred to the Review Unchecked Groups Routine of FIG. 13. In the normal course of events, the next data entry is a bar code input from the label reader 20. Once such a bar code input is received it is evaluated. First, if the scanned bar code input is equal to XX the prompt "Done With Route?" is displayed. If the inspector presses the yes button, control is transferred to the Shut Down Routine of FIG. 14. Otherwise control is returned to block 42. If the bar code input is equal to "ZZ" this is taken as an indication that further information from the keyboard 18 is to be recorded and written into the log file as an I record in block 44, before returning control to block 42.

The bar code length is then checked to determine whether or not it is equal to two. If so, the scanned bar code input is used as a pointer for the list of valid incident codes (ICODE) in the Incident File. If the scanned bar code corresponds to one of the listed valid incident codes, the appropriate I record is written to the log file in block 44 and control is returned to block 42. Otherwise, an invalid entry message is displayed and control is returned to block 42.

In this embodiment all of the Group Bar Codes are more than two characters in length, and if the bar code input is not equal to two characters in length, the Get Group Bar Code Routine then looks up the bar code in the Route File in block 46. If the bar code input corresponds to one of the stored values GBAR, an E record is written in the log file and control is transferred to the Component Loop Routine of FIG. 7. Otherwise, an invalid entry error message is displayed and control is returned to block 42.

Figure 7:
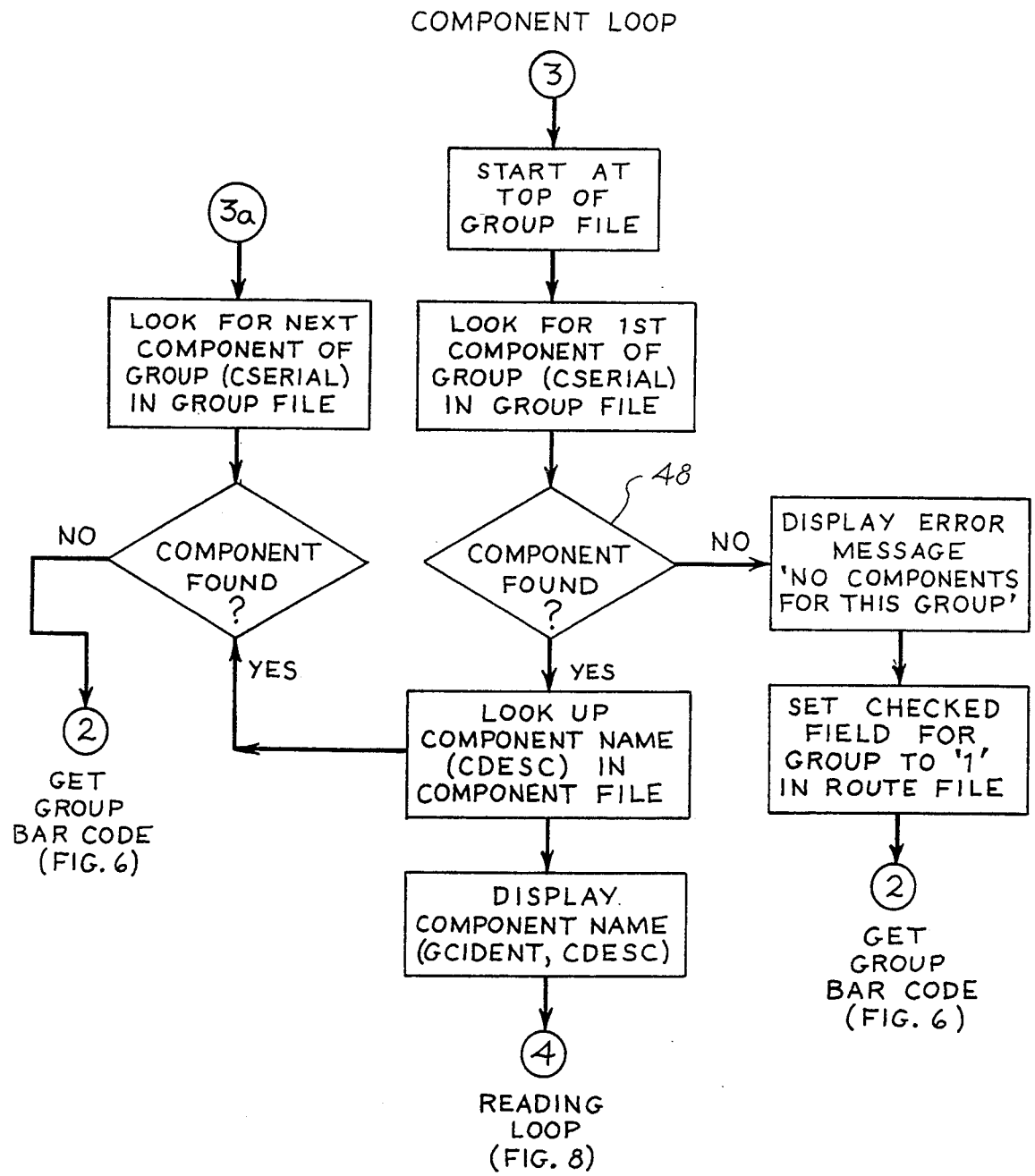

The Component Loop Routine of FIG. 7 initially starts at the top of the Group File and looks for the first component (CSERIAL) of the currently active group (GBAR). If no component is found an error message is displayed ("No Components For This Group") and the variable CHECKED is set equal to one in the Route File for the appropriate group, to indicate that this group has been checked. Then control is returned to the Get Group Bar Code Routine of FIG. 6.

Figure 8:
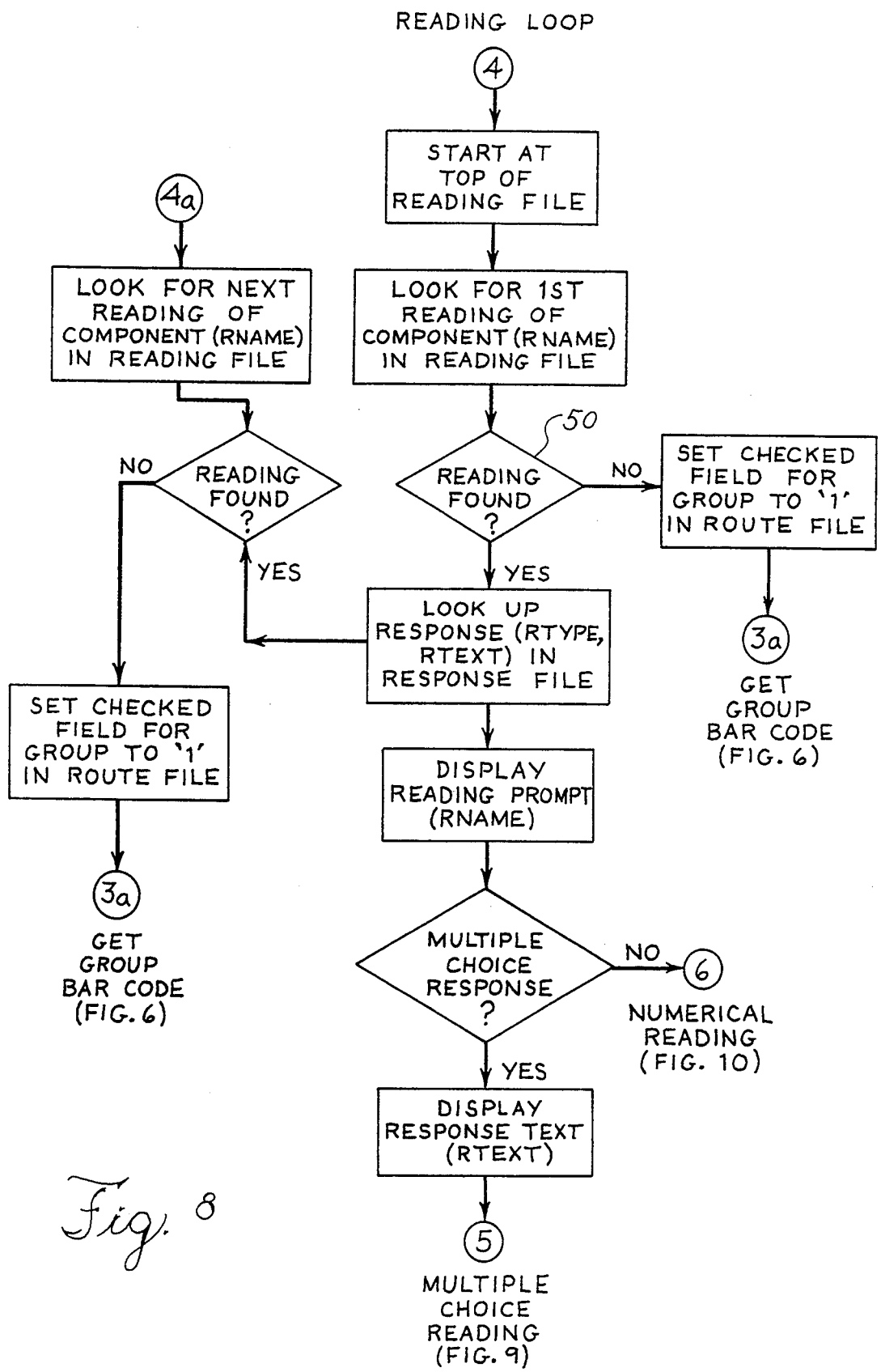

Assuming a component is found in block 48, the routine of FIG. 7 then looks up the component name (CDESC) in the Component File and displays the complete component name (GCIDENT and CDESC) before transferring control to the Reading Loop Routine of FIG. 8.

Subsequent entries to the Component Loop Routine of FIG. 7 are via the entry point 3A, and they operate similarly to the portions of the routine described above.

The Reading Loop Routine of FIG. 8 starts on initial entry at the top of the Reading File and looks for the first reading (RSERIAL) to be taken for the respective component. If no reading is found the variable CHECKED is set equal to one in the appropriate group, indicating that all readings have been taken for that group, and control is returned to the Get Group Bar Code Routine of FIG. 7. Assuming a reading is found in block 50, the appropriate response type (RTYPE) is looked up in the Response File, and the reading prompt (RNAME) is displayed. Control then branches depending upon whether or not the expected reading is a multiple choice reading or a numerical entry reading, as indicated by the variable RTYPE. In the event the expected reading is a multiple choice reading, the key identifying message is displayed and control is transferred to the Multiple Choice Reading Routine of FIG. 9. In the event the expected reading is a numerical entry, control is transferred to the Numerical Reading Routine of FIG. 10.

Figure 9:
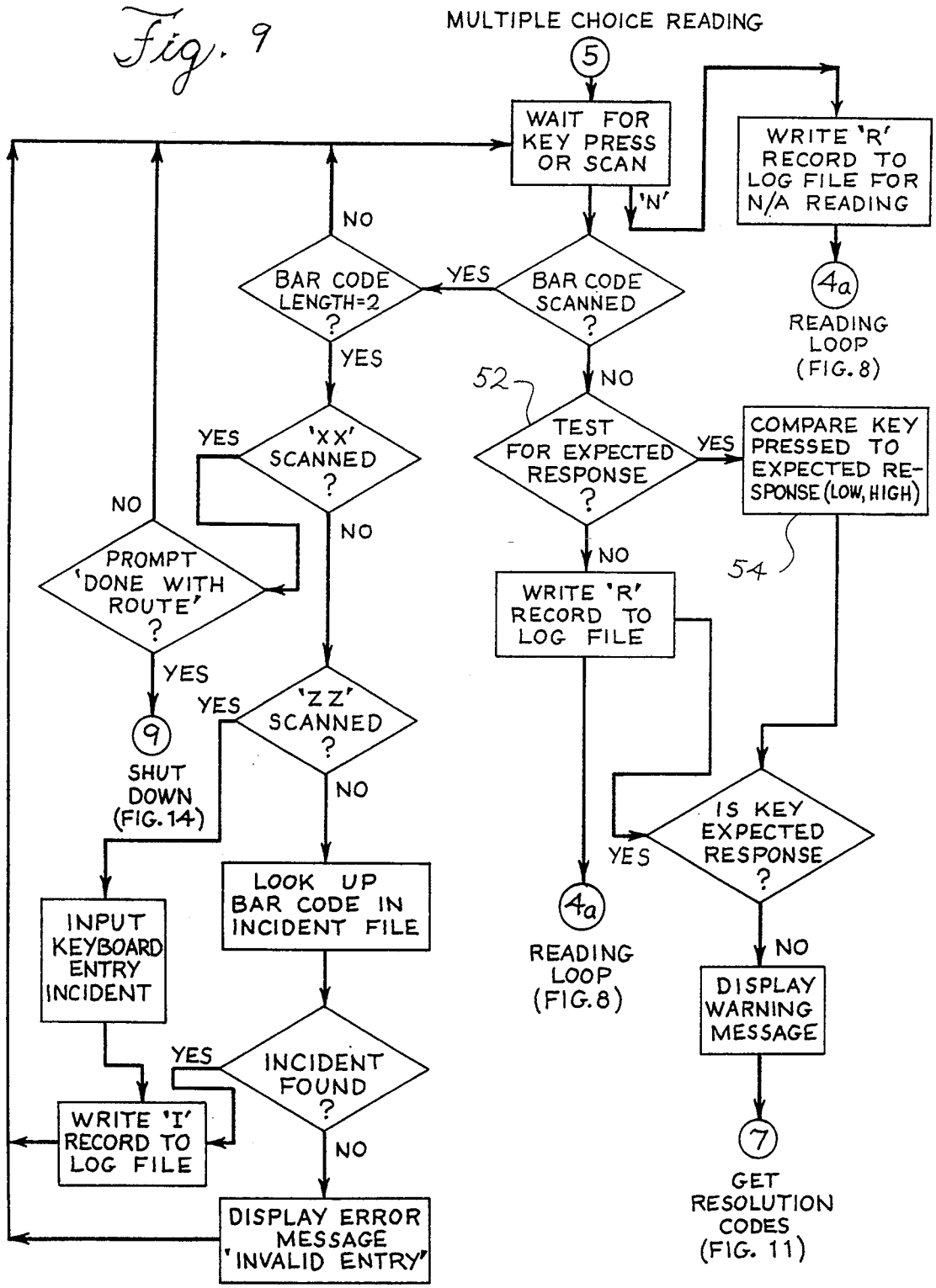

As shown in FIG. 9, when the expected reading is a multiple choice reading the routine first waits for a key press or a scan of a machine readable label. In the event the N key is pressed, an R record is written to the log file indicating that there was no applicable reading taken, and control is returned to the reading loop of FIG. 8. In the event a bar code is scanned, the scanned bar code is compared with XX, ZZ and the valid incident codes, all in a manner similar to that described above in conjunction with FIG. 6. In the event a key is pressed that is not equal to N, the routine then checks in block 52 to determine whether or not the routine is to test for an abnormal reading. If so, the routine compares in block 54 the reading entered by the inspector with information stored in the variables LOW and HIGH indicating the expected response or responses that are considered normal readings. The routine of FIG. 9 deals with multiple choice readings, and a normal reading may be yes, no, on, off, or the like. In the event the reading entered by the user is the expected response (indicative of a normal condition) the appropriate R record is written in the log file and control is returned to the Reading Loop Routine of FIG. 8. Otherwise, a warning message is displayed, and control is transferred to the Get Resolution Codes Routine of FIG. 11.

Figure 10:
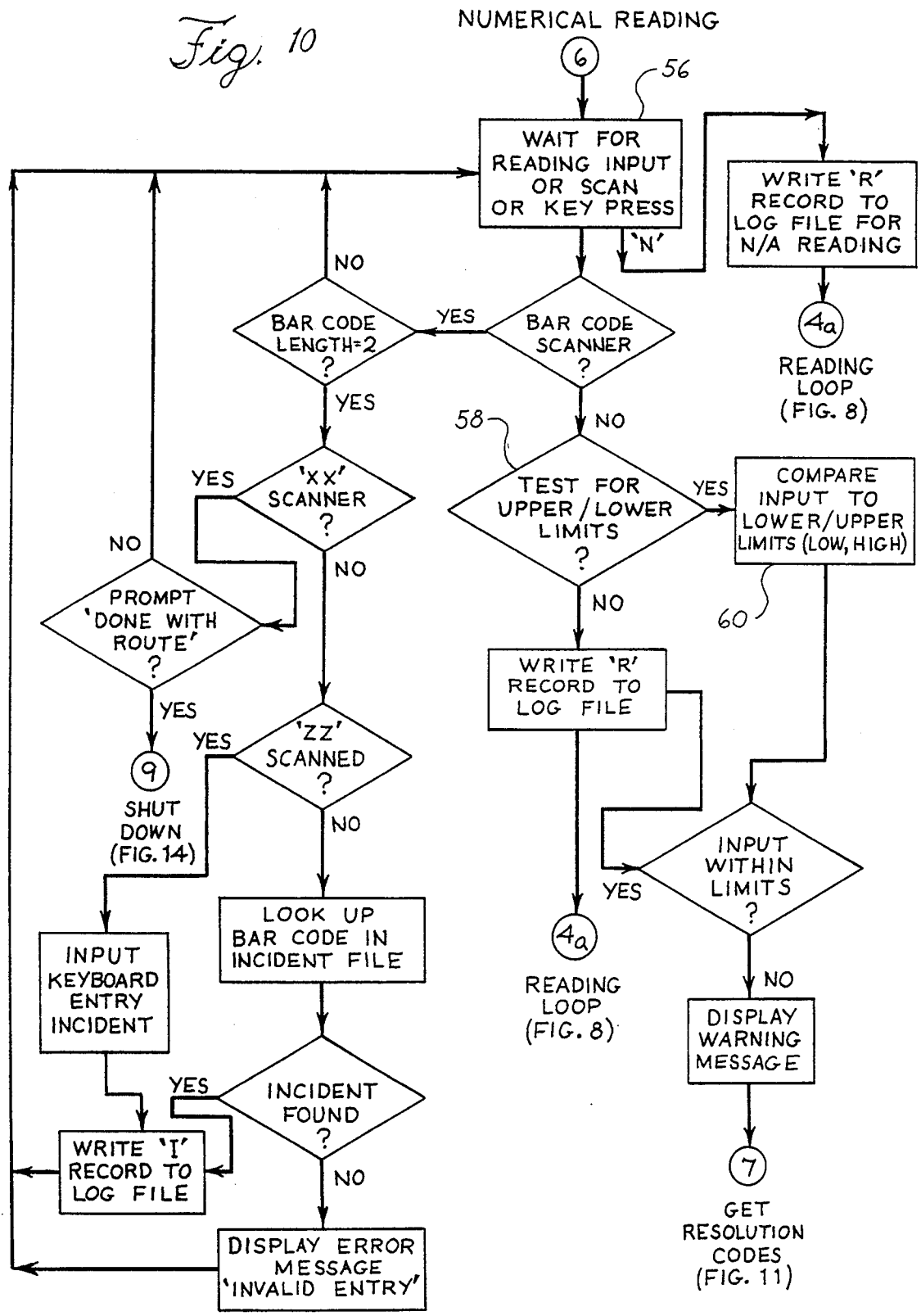

FIG. 10 shows the Numerical Reading Routine used when the reading type designated by the variable RTYPE is a numerical entry. This routine waits in block 56 for scan of a bar code from the label reader 20 or a key press from the keyboard 18. Bar codes are handled in the same manner as in the multiple choice reading routine of FIG. 9, as is the entry of the character N.

If the entry is neither the character N nor a bar code, the routine checks in block 58 to determine whether the inspector supplied reading is to be tested against upper and lower limits. If not, the appropriate R record is recorded in the log file and control is returned to the Reading Loop Routine of FIG. 8. Otherwise, the routine compares the inspector supplied reading with the upper and lower limits of the variables LOW and HIGH in block 60. If the numerical reading supplied by the inspector is within the stored limits, the appropriate R record is stored in the log file. Otherwise, a warning message is displayed, and control is transferred to the Get Resolution Code Routine of FIG. 11.

Figure 11:
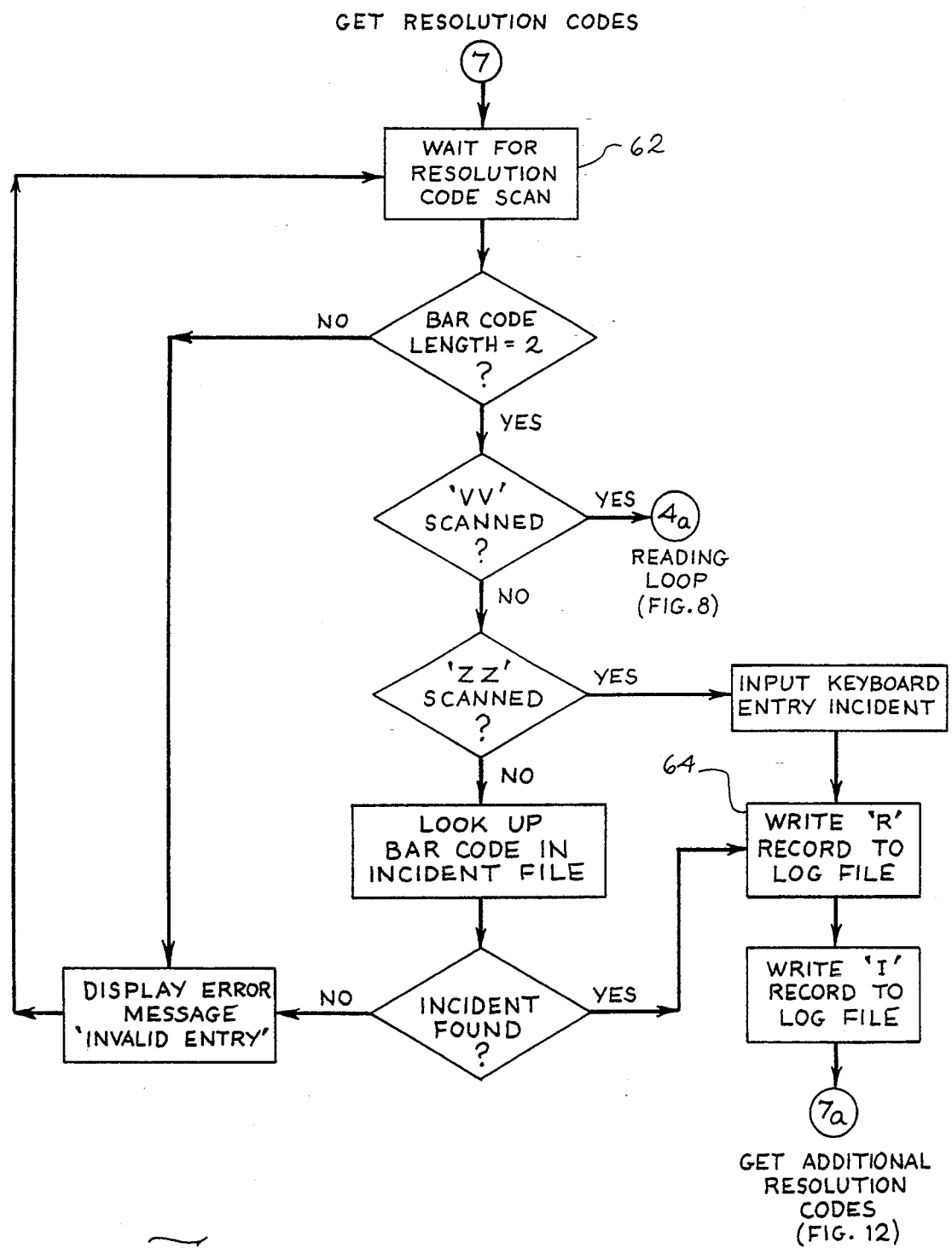

The Get Resolution Code Routine of FIG. 11 waits in block 62 for a scan of a resolution code from the label reader 20. If the scanned bar code does not have a length of two, an invalid entry error message is displayed and control is returned to block 62. If the scanned bar code is equal to ZZ, this is taken as a confirmation by the inspector that the previously entered reading was incorrect, and control is returned to the Reading Loop Routine of FIG. 8. If the scanned bar code is equal to ZZ the routine accepts a further keyboard entry as descriptive of an incident and then writes the appropriate R record and I record to the log file before transferring control to the Get Additional Resolution Codes Routine of FIG. 12. If the scanned bar code has a length of two and is not equal to VV or ZZ, the routine then looks up the scanned bar code in the Incident File, and if the scanned bar code corresponds to a valid incident code control is transferred to block 64. Otherwise, invalid entry error message is displayed and control is returned to block 62.

Figure 12:
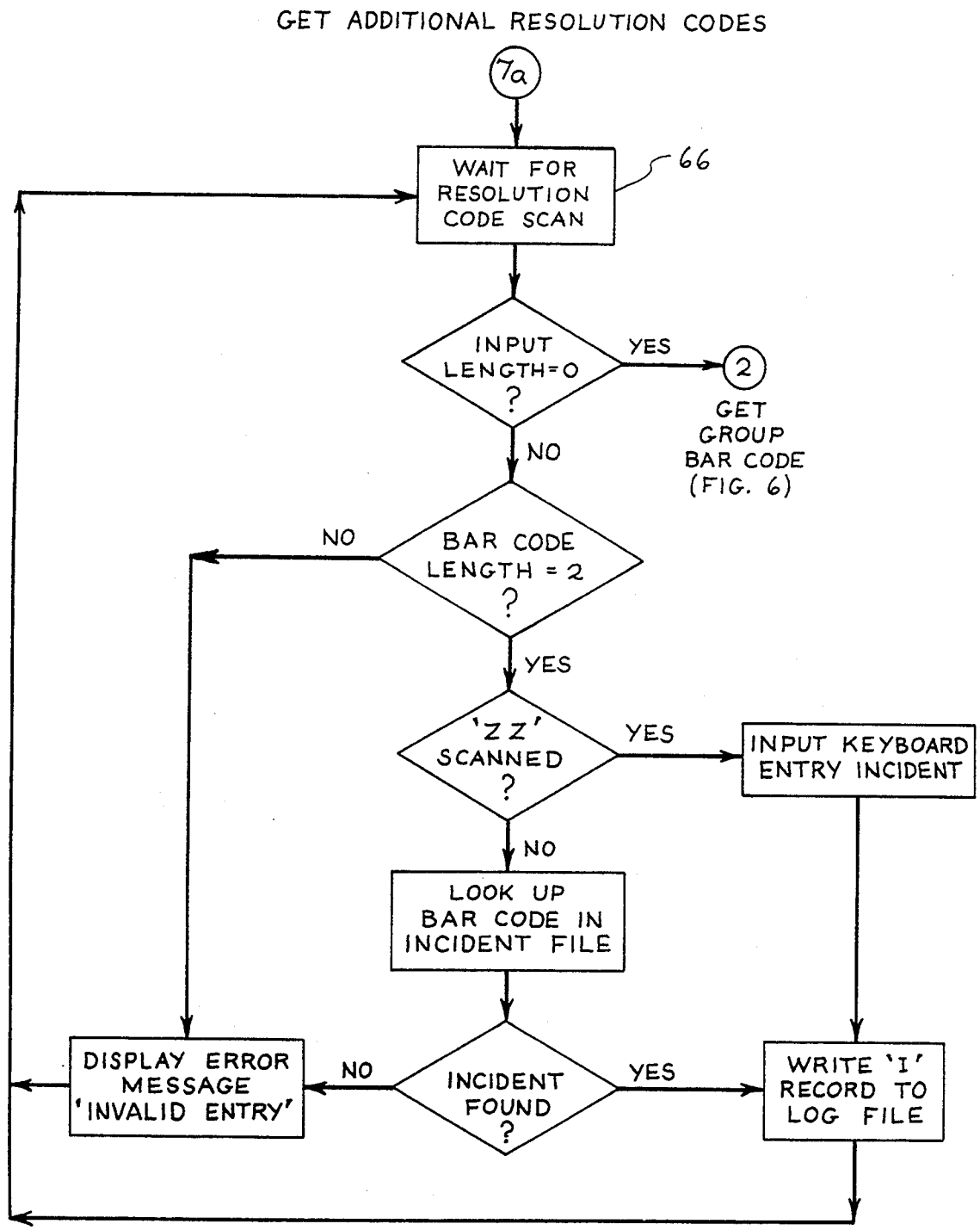

The Get Additional Resolution Codes Routine of FIG. 12 first waits in block 66 for a bar code scan from the label reader. If the scanned bar code has an input length of zero, control is transferred to the Get Group Bar Code Routine of FIG. 6. Otherwise, if the scanned bar code length is not equal to two an error message is displayed and control is returned to block 66. If the bar code is equal to ZZ keyboard entries are accepted as defining an incident and an appropriate I record is recorded in the log file before transferring control to block 66. Otherwise the scanned bar code is used as a pointer to the Incident File and the appropriate I record is recorded before transferring control to block 66.

Figure 13:
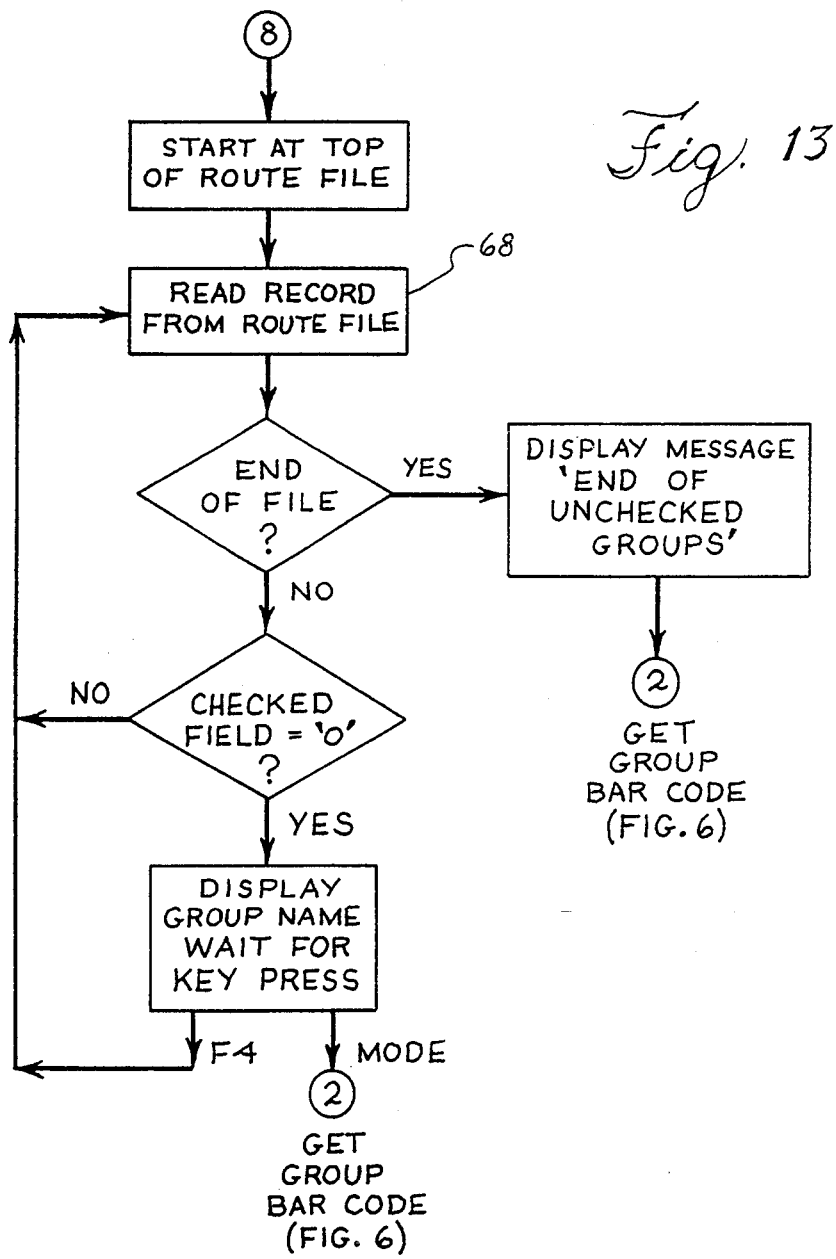

FIG. 13 is a flow chart of the Review Unchecked Groups Routine, which can be entered from the Get Group Bar Code Routine of FIG. 6. The routine of FIG. 13 starts at the top of the Route File and reads a record from the Route File. If this record is the end of file record, the message "End of Unchecked Groups" is displayed and control is returned to the Get Group Bar Code routine of FIG. 6. Otherwise, if the variable CHECKED for the respective group is equal to zero the group name is displayed until a key is pressed. If the key is the F4 key control is returned to block 68 to get the next record from the route file. If the pressed key is the MODE key control is transferred to the Get Group Bar Code Routine of FIG. 6. If the variable CHECKED is not equal to zero, this is taken as an indication that the respective group has been checked, and control is returned to block 68. In this way, the inspector can confirm whether or not all of the groups in the inspection have been checked, and if not can receive an indication of the names of the remaining unchecked groups. This assists an inspector in completing the inspection without inadvertently leaving groups unchecked.

Figure 14:
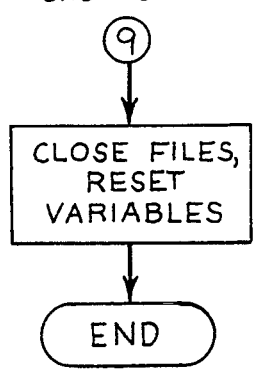

The Shut Down Routine of FIG. 14 is executed on command to close files, reset variables, and place the portable computer system in a standby mode.

Having described the program module 28, the inspection defining module 30, and the data module 32, it is now possible to illustrate the operation of the portable computer system 10 in a concrete example. This example is, of course, highly simplified, but it nevertheless illustrates important points in the operation of the system 10. This example is organized around the groups of components illustrated in FIG. 15. As shown in FIG. 15, there are three groups in this example, identified by the symbols 70, 72 and 74. Each of the groups 70, 72, 74 includes a respective machine readable label 76. These labels 76 are physically applied in the vicinity of the respective components, and the labels 76 are readable by the label reader 20. In this example, the labels 76 are optical bar code labels as indicated in FIG. 15.

The group 70 is in this example identified as the South Catwalk Group, and it includes two components, the Metering Module and the Distribution Panel. The Recirculation Area Group 72 includes a single component, the Recirculation Module, and the Boiler Area Group 74 includes a single component, the Boiler. Each of the components is to be inspected by the inspector, who is to record readings regarding the states of each of the components.

FIG. 16 provides in schematic form information regarding the two components included in the South Catwalk Group 70. Note that each of the components is associated with multiple readings, and that each reading includes a reading prompt (RNAME). Each multiple choice reading includes a key identifying message (RTEXT), and some of the readings include expected response information (LOW and HIGH). The reading prompt (RNAME) is displayed on the display 22 to describe the reading to be taken by the inspector. The key identifying message (RTEXT) is displayed on the display 22 to indicate to the inspector the choices available for a multiple choice reading. The expected response information is not displayed, but is used by the computer system 10 to test for abnormal conditions.

FIGS. 17 and 18 illustrate the displays for two of the readings shown in FIG. 16. In the first reading, the inspector is prompted to inspect the Metering Module and to determine whether the metering pump is running. Note that the lowermost line of the display includes the reading type prompts "YES" and "NO", aligned respectively with the buttons F1 and F4. These prompts are used to indicate that pressing the button F1 indicates that the metering pump is running, while pressing the button F4 indicates that the metering pump is not running. This is an example of a multiple choice reading.

FIG. 18 provides an example of a numerical reading, such as the third reading of FIG. 16. In this reading the inspector is prompted to enter the water supply pressure for the Metering Module. The last line of the display in this example includes the number 62, which is the numerical reading actually entered by the inspector.

In use, the inspector scans the machine readable labels 76 for the individual groups of components in any desired order. Returning to FIG. 15, if the Inspector scans the label 76 for the Recirculation Area Group 72, the portable computer system 10 automatically determines which components are included in the scanned group, and then automatically prompts the inspector to take the required readings for those components. Once a reading is entered, the computer system 10 checks to determine if the entered reading is of the expected type, i.e., multiple choice or numerical entry. If not, the reading is not stored in the log file.

Assuming the inspector supplied reading is of the expected type, the system 10 then checks to determine whether or not the inspector supplied reading is indicative of an abnormal condition. The abnormal condition check is optional, and is not required for all readings. However, if an abnormal condition is indicated, the computer system 10 generates a warning signal, for example a warning tone and an error message, to alert the inspector to check the most recent reading for accuracy. The inspector can also add incident codes identifying an abnormality, an action that was taken, or an action that should be taken.

All of this information is recorded in the log file for later use. When all of the readings for a particular group have been taken, the inspector is prompted to scan the machine readable label 76 for a next group. This process continues until all of the readings of the all of the components of all of the groups have been taken. The inspector can, if necessary, obtain an indication of whether any unchecked groups remain, and if so, the names of the unchecked groups.

FIG. 19 is an example of a report that can be generated by a report generating computer (not shown) in response to the log file of the data module 32. After an inspection is completed, the log file contained in the data module 32 can be downloaded into a report generating computer (now shown) which utilizes the entries of the log file to generate a report such as that shown in FIG. 19. This report identifies the groups, components, and readings of the inspection, along with the actually entered readings and the expected responses. In addition, time and date stamps are provided, in this case only for the time and date the machine readable labels 76 were scanned. This report also lists all incidents recorded by the inspector such as "Required Action Taken" or "Report To Supervisor". Also, out of range readings are automatically flagged.

Of course, many other reports are possible. For example, reports can be generated that only indicate abnormal conditions, out of range or incorrect conditions, or equipment groups not checked. Also, reports can be generated that automatically list work order reports by craft for abnormalities that require more attention. Additionally, historical reports can be generated for individual components, equipment groups, inspectors, abnormalities or the like.

From the foregoing description it should be apparent that the preferred embodiment described above provides many advantages. Significantly, the system 10 combines bar code technology with prompting technology such that only a limited number of machine readable labels must be scanned, yet the user is efficiently prompted to complete the inspection. This eliminates the inefficiency of a multitude of machine readable labels which must each be found and scanned to complete the inspection.

Furthermore, the inspection is well documented and supervisors are provided with a tamper-proof record of when inspections were made. Because the inspector must actually be in the physical vicinity of the components to scan the machine readable labels, the possibility of a fabricated inspection is generally reduced.

The system 10 eliminates or reduces handwritten entries, and it allows reports to be generated efficiently without transcription errors. Paperwork is substantially eliminated. Also, the system 10 allows the inspector to take gauge readings quickly and accurately, and by automatically flagging an abnormal condition the system encourages an inspector to confirm that an abnormal condition is real rather than the result of an erroneous data entry. All of these features combine to provide a system with excellent efficiency of operation and use.

Of course, if should be understood that a wide range of changes and modifications can be made to the preferred embodiment described above. A wide variety of hardware can be used to implement this invention, and it is certainly not limited to the particular details of construction described above. Additionally, those skilled in the art will recognize that a wide variety of programming techniques can be used to implement the functions described above, and it is not intended that this invention be limited to the specific programming techniques illustrated in the drawings or included in the enclosed listing.. Also, the various aspects of this invention can be used separately rather than in combination. For example, a system employing the first aspect of this invention as described above need not necessarily test readings for abnormal conditions, and a system employing the second aspect of this invention as defined above need not organize the inspection defining module in terms of components rather than readings. Though the use of machine readable labels and a label reader is preferred, some alternative embodiments include neither. Such embodiments may rely on the inspector to enter identifying data for the group manually via the keyboard of the system 10.

It is therefore intended that the foregoing detailed description be regarded as illustrative rather than limiting, and that it be understood that it is the following claims, including all equivalents, which are intended to define the scope of this invention.

I claim:

1. An inspection prompting and reading recording system comprising:
   a portable computer system comprising a display, a data entry system, a memory, and a processor responsive to the data entry system to control the display and the memory;
   said memory comprising an inspection defining module and a data module, said inspection defining module comprising a plurality of groups, each of the groups identifying a plurality of records identifying prompt information for a respective plurality of inspections associated with at least one respective component, first ones of the records identifying expected response information that defines a set of normal readings for the respective inspection, second ones of the records comprises expected response information that defines a set of acceptable multiple choice responses for the respective inspection;
   said processor operative in response to said data entry system to display on the display the prompt information associated with each of the records of one of the groups when the data entry system receives identifying information associated with that group;
   said processor operative to store readings and multiple choice responses entered by a user via the data entry system in response to the prompt information, said readings and multiple choice responses stored by the processor in the data module of the memory for later processing;
   said processor operative to alert a user when a comparison between one of the user supplied readings and the respective expected response information associated with one of the first ones of the records indicates an abnormal condition;
   said processor operative to alert the user when a comparison between one of the user supplied multiple choice responses and the respective expected response information associated with one of the second ones of the records indicates an abnormal response.

2. The invention of claim 1 wherein the processor is operative to allow the user to provide an action response via the data entry system after being alerted of an abnormal condition to indicate user response to the respective abnormal condition.

3. The invention of claim 1 wherein at least some of said records specify reading type information that identifies a type of reading required for the respective inspection; and wherein said processor is further operative to store only readings of the type identified by the respective reading type information.

4. The invention of claim 1 wherein the processor is operative to store user comments in the data module.

5. The invention of claim 1 wherein the processor is operative to identify via the display a group for which the data module does not contain stored user supplied readings.

6. The invention of claim 1 wherein at least some of the sets of inspections comprise a plurality of inspections.

7. The invention of claim 1 wherein said data entry system comprises a label reader responsive to a plurality of machine readable labels, each associated with a respective one of the groups, to provide said identifying information to said processor.

8. An inspection prompting and reading recording system comprising:
   a portable computer system comprising a display, a data entry system, a memory, and a processor responsive to the data entry system to control the display and the memory;
   said memory comprising an inspection defining module and a data module, said inspection defining module comprising a plurality of groups, each of the groups identifying a plurality of records identifying prompt information for a respective set of inspections associated with a respective component, first ones of the records comprising expected response information that defines a set of normal readings for the respective inspection, second ones of the records comprising expected response information that defines a set of acceptable multiple choice responses for the respective inspection;

means, included in the processor and responsive to the data entry system, for controlling the display to display the prompt information for each of the records of one of the groups when the data entry system receives identifying information associated with that group;

means, included in the processor and responsive to the data entry system, for storing readings and multiple choice responses supplied by a user in response to the prompt information;

means, included in the processor, for alerting a user when a comparison between one of the user supplied readings associated with one of the first ones of the records and the respective expected response information indicates an abnormal condition; and means, included in the processor, for alerting the user when a comparison between one of the user supplied multiple choice responses and the respective expected response information associated with one of the second ones of the records indicates an abnormal response.

9. The invention of claim 8 wherein said processor further comprises means for allowing the user to provide an action response via the data entry system after being alerted of an abnormal condition, each said action response indicative of user response to the respective abnormal condition.

10. The invention of claim 8 wherein at least some of said records specify reading type information that identifies a type of user reading required for the respective inspection; and wherein said processor comprises means for inhibiting storage of user supplied readings of a type other than the type identified by the respective reading type information.

11. The invention of claim 8 wherein the processor further comprises:

means for storing user comments in the data module.

12. The invention of claim 8 wherein the processor further comprises:

means for identifying on the display a group for which the data module does not contain stored user supplied readings.

13. The invention of claim 8 wherein at least some of the sets of inspections comprise a plurality of inspections.

14. The invention of claim 8 wherein said data entry system comprises a label reader responsive to a plurality of machine readable labels, each associated with a respective one of the groups, to provide said identifying information to said processor.

* * * * *